United States Patent [19]

Heimbrecht

[11] 4,167,340
[45] Sep. 11, 1979

[54] DOUGH MIXING AND KNEADING DEVICE

[75] Inventor: Bernhard Heimbrecht, Langenhagen, Fed. Rep. of Germany

[73] Assignee: Werner & Pfleiderer, Stuttgart, Fed. Rep. of Germany

[21] Appl. No.: 886,780

[22] Filed: Mar. 15, 1978

[30] Foreign Application Priority Data

Mar. 26, 1977 [DE] Fed. Rep. of Germany ....... 2713450

[51] Int. Cl.$^2$ ............................................. B01F 7/08
[52] U.S. Cl. .................................... 366/99; 366/342
[58] Field of Search .................................. 366/97-99, 366/241, 279, 342, 343; 15/93 R, 104.09, 104.1 C, 104.11, 104.13

[56] References Cited

U.S. PATENT DOCUMENTS

| | | | |
|---|---|---|---|
| 1,857,361 | 5/1932 | Davis | 366/99 |
| 1,957,334 | 5/1934 | Haas | 366/97 X |

Primary Examiner—Leonard D. Christian
Attorney, Agent, or Firm—Hane, Roberts, Spiecens & Cohen

[57] ABSTRACT

A dough mixing and kneading device which comprises a horizontally disposed container including an elongate cylindrical space closed by walls at the ends of the container and three blades within the space extending lengthwise therein. The blades are secured to and driven by drive shafts protruding through the end walls of the container. The blades when driven rotate along circular paths radially spaced from each other, one of the blades rotating closely adjacent to the inside wall surface of the container thereby acting as a scraper. A lengthwise opening at the top of the container is provided for loading the container with dough and discharging the dough after mixing and kneading by rotating the container about its center axis. A fixedly mounted cover closes the opening when the opening is turned into its upwardly facing position.

10 Claims, 2 Drawing Figures

DOUGH MIXING AND KNEADING DEVICE

The present invention relates to a dough mixing and kneading device, and particularly to a device comprising a horizontally disposed container having a lengthwise inner cylindrical space and a rotary mixing and kneading tool including blades and coaxially supported by the end walls of the container, said container including at least one outwardly extending pocket-shaped recess being provided in the circumferential wall within the container.

BACKGROUND OF THE INVENTION

In a device of the above-indicated type, known from British Pat. No. 1,015,880, a rapidly rotating mixing and kneading tool consists of a shaft which extends lengthwise through the ends of a container and mounts a plurality of radial beaters or knives arranged alongside of and spaced from one another. In the lower part of the container a plurality of stationary knives are arranged which all extend into the spaces between the rotating beaters or knives. In approximately the same plane as the stationary knives, inwardly directed flat projections are provided on the end walls of the container. In the circumferential wall of the container there are two approximately diametrically, opposite pocket-shaped recesses the essentially horizontal surfaces of which offer resistance to the dough carried along by the beaters, thereby effecting a stretching of the dough.

While this action may be somewhat useful for the kneading of the dough, it does not have an effect of the desired extent in the known device as due to the position of the recesses provided therein, the dough deposits firmly in them which not only reduces the desired kneading action but also causes difficulties with the emptying of the container. Another substantial disadvantage, particularly with kneading of firm or tough doughs, is that high shearing forces are produced by the interengagement of the fixed and the rotating knives or beaters. These forces tend to cause an unacceptable overheating of the dough due to friction and to a similarly undesirable repeated tearing of the gluten structure of the dough. Furthermore, there is the danger that parts of the dough will adhere firmly to the drive shaft or on portions of the circumferential wall. Such adhering dough will be carried by the ends of the knives or beaters so that they are not subjected to the actual kneading treatment.

In another type of high-speed kneader, such as disclosed for instance in U.S. Pat. Nos. 1,672,264 and 1,726,033, a mixing and kneading tool rotates horizontally in a U-shaped trough. This tool consists of a continuous shaft having a plurality of parallel kneading bars held by radial arms. In such devices the kneading effect is produced in a manner such that the dough which winds itself about the kneading tool is thrown against the wall of the trough by the centrifugal forces which are generated by the relatively high operating speeds. As a result of the friction produced thereby, the dough becomes rapidly overheated. In order to avoid this, rotatable deflector means are provided along the wall of the trough to keep the dough away from the wall. This, however, does not eliminate the detrimental effects but only transfers them to a different place as now high shearing forces are produced in the dough when in the vicinity of the deflectors.

British Pat. No. 1262-AD/1880 discloses a dough mixing and kneading device having a U-shaped trough and a mixing and kneading tool without continuous shaft. The mixing and kneading tool consists of three pairs of radial arms of different length. Between each two of these arms there is arranged a grid-shaped construction of longitudinally and transversely extending knives or blades. Such a kneading tool can be operated in practice only at relatively low speeds of rotation. When employed in a high-speed kneader, high frictional forces would be generated entailing detrimental effects on the dough. The centrifugal forces increase as the square of the speed and moreover, the removal of the entire dough from such a kneading tool upon emptying of the device presents considerable difficulties.

THE INVENTION

The broad object of the present invention is to improve the output of a dough mixing and kneading device of the aforementioned type in such a manner that, despite an intensive mixing and kneading action, the dough does not experience any damage, especially one due to overheating.

SUMMARY OF THE INVENTION

This object is obtained in accordance with the invention by providing that the mixing and kneading tool comprises several preferably at least three, separate kneading blades, each rotating on a separate circular path about the longitudinal center axis of the container. These blades follow each other at approximately the same angular distances apart in the circumferential direction, the outermost blade acting as scraper along the inner wall surface of the container. Each kneading blade is fastened at its ends to arms extending from shafts which are journalled in the end walls of the container. A generally pocket-shaped lengthwise elongate recess is formed at the top of the container by an opening or inlet defined by radially slanted cuts in the container wall. The opening serves as charging and emptying opening in combination with a cover which is held spaced apart from the circumferential wall by a frame which surrounds the opening.

As a result, there is obtained an effective mixing and kneading which also secures a soft handling of the dough. The advantageous effect is particularly due to the fact that as a result of the large space which is free of the mixing and kneading tool parts the dough has the possibility of carrying out rolling movements in the container, the kneading blades acting primarily upon the dough in very rapid sequence of the moments necessary for these movements. The rolling movements of the dough in combination with the resistance which the dough experiences due to the action upon the circumferential wall of the container by the centrifugal forces which are produced at the high circumferential speed, produce an intensive pulling and pushing of the dough without the dough being exposed to excessive shearing or frictional forces tending to generate damaging heating of the dough. By the provision of a pocket-shaped recess in the container wall, the kneading at the top of the container is improved.

A frequent change in the position of the dough is effected in a particularly effective manner in that it is not possible for the dough to remain in the same position as it passes continuously back into the region of the motions of the kneading blades due to the action of gravity. Since dough cannot be deposited anywhere else in the container as a result of the scraping action of the outer kneading blade, there are no untreated portions of the dough so that at the same time a complete emptying and automatic cleaning of the device can be effectively carried out.

A particularly effective action of the mixing and kneading device in accordance with the invention is obtained when the circular paths along which the kneading blades rotate provide diameters which are equal to or larger than half of the inside diameter of the space within the container as the dough can then move into a relatively large free space between the kneading blades whereby a repeated cutting or tearing of the dough by the kneading blades is effectively impeded.

The kneading blade which serves as scraper is preferably shaped with a wedge-shaped cross section and positioned at a narrow angle relative to the wall of the container. This shape, which assures a smooth flow can also be used for all the other kneading blades and/or the lateral arms mounting the blades. As a result of which, not only the manufacture of the said parts is simplified, but the result is also obtained that only a minimum resistance is opposed by the dough to the rotating blades.

According to another feature of the invention, the blades are curved backwards with respect to the direction of rotation, whereby an additional movement directed towards the center of the container is imparted to the dough. This movement not only improves the mixing of the dough, but also assists in the emptying of the container.

It is particularly advantageous for emptying of the container in that as a further feature of the invention the cover of the opening is shaped as an elongate section of a cylinder fixed in position and concentric to the circumferential wall of the container. The container is rotatable about its longitudinal axis to effect emtpying of the container.

BRIEF DESCRIPTION OF THE INVENTION

An embodiment of the invention is shown diagrammatically in the drawing by way of illustration and not by way of limitation, and will be described in detail hereinafter.

DETAILED DESCRIPTION OF THE INVENTION

The dough mixing and kneading device as shown comprises a horizontally disposed tubular container 1 preferably of circular cross-section and including an elongate cylindrical space and a mixing and kneading tool 2 which is rotatable within said space.

Figure 2:
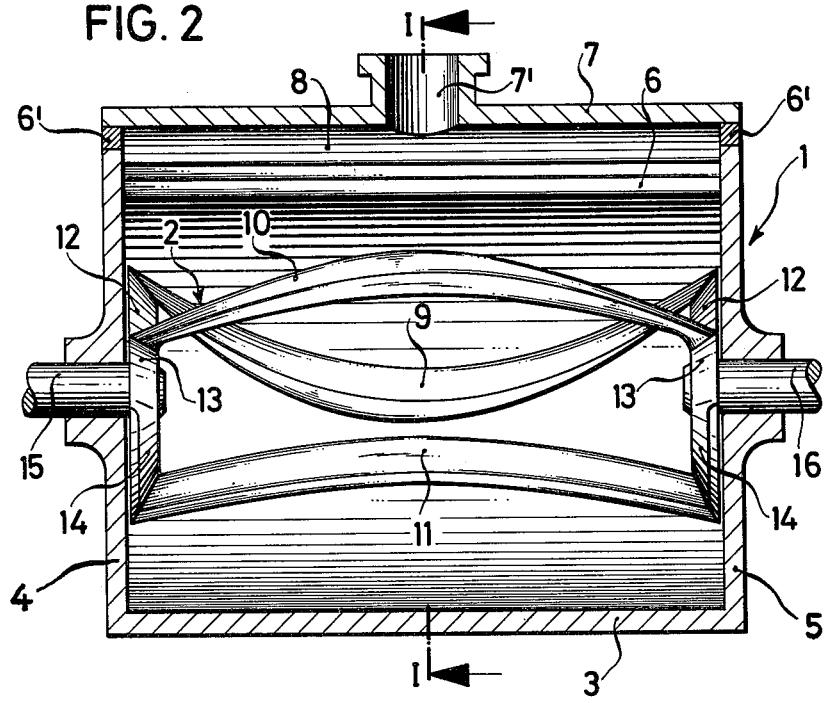
FIG. 2 is a longitudinal section taken along line II—II in FIG. 1.

Container 1 comprises a circumferential wall 3 and end walls 4 and 5. At the top of the container the circumferential wall 3 has an opening 6 which is lengthwise rectangular when seen in top view and in the present embodiment extends over the length of the container as shown in FIG. 2. The opening 6 which serves as a filling and emptying opening is surrounded by a frame 6' which is secured to the wall 3 and serves to hold a cover 7 spaced apart from the circumferential wall 3. The cover is fixedly mounted relative to the container and closes the opening when and while the device is operated. There is further provided an outwardly extending pocket-shaped recess 8 of the space within the container. The function of the recess will be described further below. The cover 7 has the shape of a lengthwise section of a cylinder which is concentric to the circumferential wall 3 of the container. The cover is held in position by frame 6' spaced apart from the wall 3 and is provided with a filling spout 7'.

Figure 1:
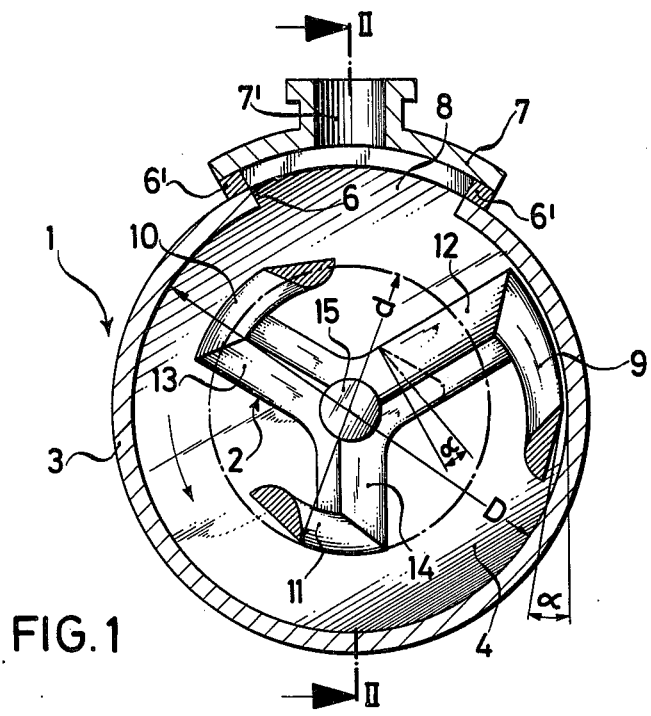
FIG. 1 is a cross-section taken along line I—I in FIG. 2.

To facilitate emptying of the container upon completion of the mixing and kneading of the dough, the container is pivotable about its center axis into a position in which the opening 6 faces downwardly while the cover 7 and the feeding chute 7' remain in the position shown in FIG. 1.

The mixing and kneading tool 2 is shown by way of example as having three kneading blades, 9, 10 and 11, each of which is fastened at its ends to radially disposed arms 12, 13 and 14, extending from drive shafts 15 and 16. Shafts 15,16 are rotatably supported or journalled in the end walls 4,5 of the container 1 and are connected to a conventional driving means (not shown). The arms 12, 13 and 14 are of different lengths so that each of the blades 9, 10 and 11 rotates along its own circular path around the longitudinal axis of the container 1. The circular path of the outermost kneading blade 9 is closely adjacent to the inside of the circumferential wall 3 so that this kneading blade also acts as a scraper. The diameter of the circular path of the kneading blade 9 corresponds—disregarding the necessary clearance for movement—to the inside diameter D of the container 1. The diameter d of the circular path of the inner kneading blade 11 shown in dash-dot lines in FIG. 1, is larger than half the inside diameter D so that all kneading blades rotate within an annular space which is defined by the circular surfaces defined by the diameters D and d. The circular path of blade 10 is intermediate the circular paths of blades 9 and 11, as is shown in FIG. 1.

The kneading blade 9, which serves as a scraper, is wedge-shaped in cross-section and is disposed at a narrow angle $\alpha$ with respect to the inner circumferential wall of the container. The same cross-sectional shapes and the same angles are present also on the respective parts of the other kneading blades 10, 11 as well as on the arms 12, 13,14. In FIG. 1 the cross-section and the angle with the arm 12 with respect to the end wall 4 are indicated by dash-dot lines.

The kneading blades 9, 10, 11 are curved backwards relative to their circular paths with respect to the direction of rotation, as indicated by the arrow in FIG. 1. This curvature need not be the same as shown in the drawing, but may also be of arrow-shape since in both cases an additional movement directed towards the center of the container will be imparted to the dough. This movement is supported further by the above-mentioned shape of the radial arms 12, 13, 14 which at the same time scrape the end walls 4, 5.

Referring to FIG. 1, the mixing and kneading tool 2 rotates in the container 1 in counterclockwise direction. The circumferential speed of the outermost kneading blade 9 is about 4 to 5 meters per second which, depending on the size and capacity of the container, corresponds to a speed range of about 50 to 150 rpm. As a result of such high circumferential velocity of the kneading blades, the dough is thrown outwardly against the circumferential wall position 6 of the container from which, however, it is continuously scraped off by the outermost kneading blade 9. The dough is thus forced into rolling movements by the radially and tangentially acting forces thus produced. As a result, substantially less frictional forces are produced by these rolling movements than are produced in the now known devices in which the dough is primarily pushed along the wall of the container. The condition for obtaining the advantageous rolling movements is predominantly the relatively large free space between the kneading blades. The travel of the kneading blades through different circular paths inherently causes the rolling dough to be continuously subjected to varying motional momenta by which, in turn, the dough is additionally pressed and pulled. Further stretching and pressing are experienced by the dough when it enters the region of the pocket-shaped recess 8. As a result, the shape and the position of the dough are changed so that constantly new points of attack are provided for action by the kneading blades.

As indicated before, the rotatable blades are driven by suitable and conventional drive means, such as an electric motor (not shown).

In contrast to the known device, the time during which the dough dewells in the pocket-shaped recess 8 is extremely short as the dough virtually immediately moves back into the container space proper due to the action of gravity. The above-explained soft treatment of the dough coupled with simultaneously efficient kneading effect makes it possible to operate devices according to the invention with very high speeds of rotation which, in turn, results in shorter kneading times and thus in an increase in the output of the device.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A dough mixing and kneading device comprising in combination: a substantially horizontally disposed cylindrical container including end walls, a mixing and kneading tool coaxially disposed in said container and including drive shaft means journalled in said end walls, a plurality of mixing and kneading blades, and radially extending support arms for said blades, each of said arms extending from said drive shaft means and being secured to the respective blade, the arms being circumferentially spaced relative to one another and having radial lengths different from the arms of other blades, thereby causing the blades to travel along circular paths of different diameters upon rotation of the shaft means, the radial length of the longest arm being such that the respective blade rotates closely adjacent to the inner cylindrical surface of said container thereby scraping dough accumulating thereon, said container having a lengthwise elongate opening at the top thereof for loading and emptying the container; a cover above said container for closing said opening in said container, said cover being disposed in register with said opening when the container is in an operating position, said container being pivotal about its center axis to a position in which said opening is clear of the cover for emptying the container and a frame extending outwardly from said container and secured thereto along the edge of said opening for sealing said opening by the cover, said container and frame having aligned radially inclined edges at said opening to form a substantially pocket-shaped space at the top of the container in said operating position.

2. The device according to claim 1 wherein said cover is stationarily mounted and has a curved configuration relative to the center axis of the outer configuration of the container.

3. A device as claimed in claim 2 wherein said cover includes filling spout means.

4. The device according to claim 1 wherein said drive shaft means is a two-part shaft, each of said shaft parts being journalled in one of said end walls, and wherein a pair of arms is provided for each blade, each arm of each pair is secured at one end to one shaft part and at the other end to the respective end of one of the blades.

5. The device according to claim 1 wherein the radial length of said arms are such that the circular paths of the blades when rotating are dimensioned to occupy less than half of the diameter of the cylindrical space within the container.

6. The device according to claim 1 wherein the blade circulating closely adjacent to the inner surface of the container is disposed at a narrow angle relative to said surface.

7. The device according to claim 6 wherein all the blades are disposed at the same angle relative to the inner surface of the container as the blade closely adjacent to the inner surface of the container.

8. The device according to claim 6 wherein the arms mounting the blades have a cross-sectional configuration substantially similar to that of the blade rotating closely adjacent to the inner surface of the container.

9. The device according to claim 6 wherein the arms support the blades at the ends thereof and all the arms are disposed at the same angular orientation as the blade closely adjacent to the inner surface of the container.

10. The device according to claim 1 wherein said blades are inwardly curved relative to the center axis of the container.

* * * * *